United States Patent [19]

Johnson et al.

[11] Patent Number: 5,616,864

[45] Date of Patent: Apr. 1, 1997

[54] METHOD AND APPARATUS FOR COMPENSATION OF MICROMACHINED SENSORS

[75] Inventors: Jack D. Johnson, Rossville; Fie A. Liem, Carmel, both of Ind.

[73] Assignee: Delco Electronics Corp., Kokomo, Ind.

[21] Appl. No.: 391,854

[22] Filed: Feb. 22, 1995

[51] Int. Cl.$^6$ .......................... G01C 19/00; G01P 15/08
[52] U.S. Cl. ................... 73/504.04; 73/504.12; 73/504.13
[58] Field of Search .......................... 73/504.02, 504.03, 73/504.04, 504.12, 504.13

[56] References Cited

U.S. PATENT DOCUMENTS

| | | | |
|---|---|---|---|
| 3,113,463 | 12/1963 | Holt, Jr. | |
| 3,307,409 | 3/1967 | Newton, Jr. | 73/504.13 |
| 3,559,492 | 2/1971 | Erdley | |
| 3,924,475 | 12/1975 | Stiles | 73/504.13 |
| 4,851,080 | 7/1989 | Howe et al. | |
| 4,901,570 | 2/1990 | Chang et al. | 73/517 |
| 5,233,874 | 8/1993 | Putty et al. | 73/517 |
| 5,383,362 | 1/1995 | Putty et al. | 73/505 |
| 5,450,751 | 9/1995 | Putty et al. | 73/505 |

FOREIGN PATENT DOCUMENTS

| | | |
|---|---|---|
| 442280A2 | 8/1991 | European Pat. Off. |
| 461761A1 | 12/1991 | European Pat. Off. |

OTHER PUBLICATIONS

Michael W. Putty et al., "A Micromachined Vibrating Ring Gyroscope," Solid State Sensor and Actuator Workshop, Jun. 1994, pp. 213–220.

Primary Examiner—Hezron E. Williams
Assistant Examiner—Richard A. Moller
Attorney, Agent, or Firm—Mark A. Navarre

[57] ABSTRACT

A yaw rate sensor having a vibrating ring microstructure surrounded by electrodes capacitively coupled to the ring has vibration responsive circuits with inputs connected to several of the sensors, the circuits having outputs connected to others of the electrodes for driving or influencing the vibration. The circuits produce a main drive voltage to excite the ring to resonance, a feedback drive voltage to provide force-to-rebalance correction, and a dc compensation voltage to tune the ring to a single resonance frequency. An economy of electrode space is achieved by using some electrodes for more than one function, e.g. feedback and compensation.

9 Claims, 2 Drawing Sheets

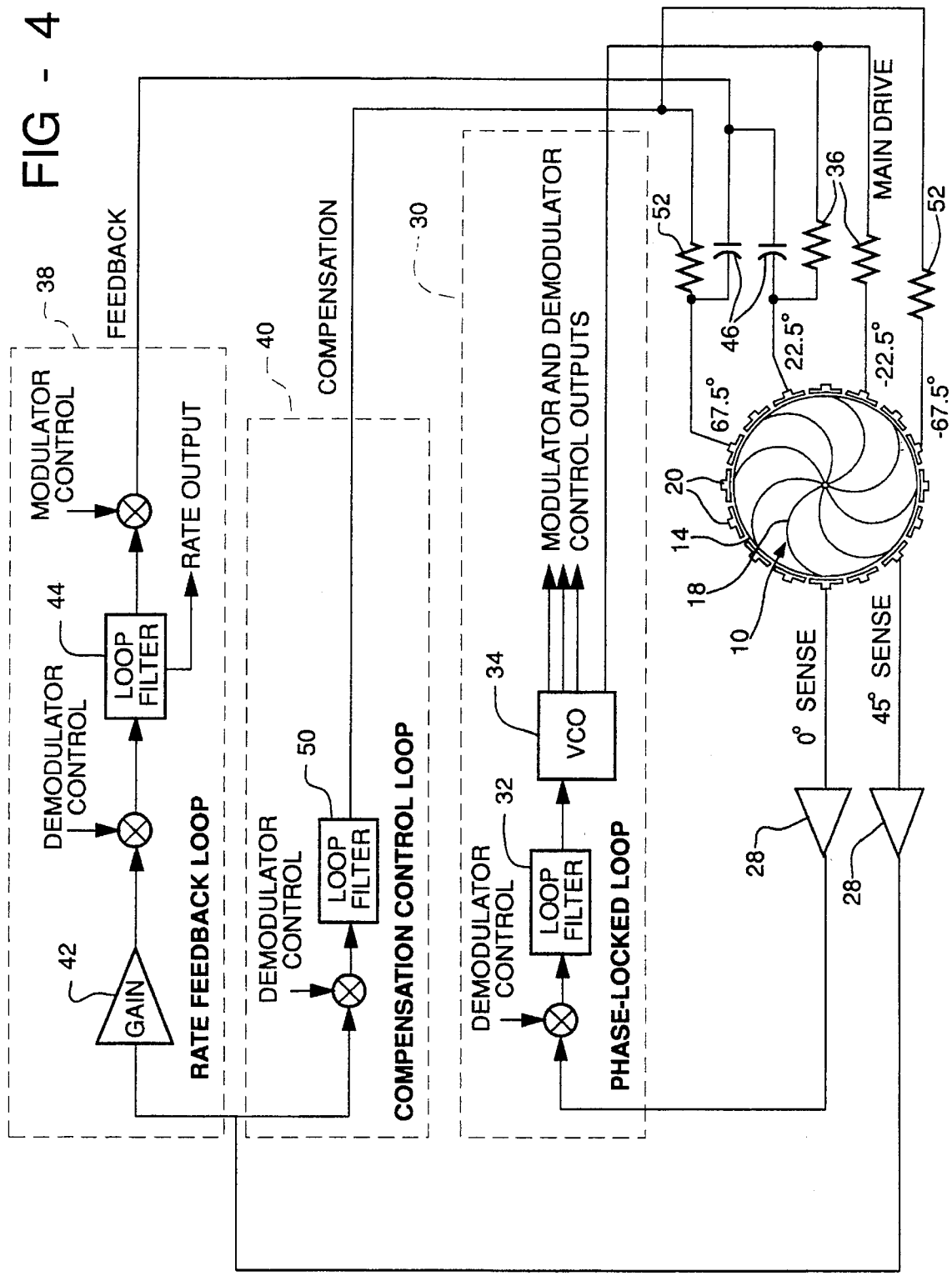

METHOD AND APPARATUS FOR COMPENSATION OF MICROMACHINED SENSORS

FIELD OF THE INVENTION

This invention relates to sensors using capacitively coupled microstructures and particularly to a method and apparatus for effectively resolving two natural resonance frequencies of a microstructure to a single frequency in operation.

BACKGROUND OF THE INVENTION

Miniature sensors such as gyroscopes useful for measuring or detecting movement or acceleration in particular have been fabricated by micromachining motion sensitive elements in integrated circuit chips. Such devices, based on vibrating mechanical elements which sense rotation, can be produced inexpensively by batch processing and yet yield performance suitable for many applications which require a low cost. One such application, for example, is the detection of yaw for sophisticated controls in automotive vehicles.

One sensor of this type incorporates a micromachined ring which is excited into vibration at its resonant frequency. The direction or orientation of vibration is somewhat dependent on rotation of the sensor so that the vibration can be analyzed to sense directional changes. An array of electrodes capacitively coupled to the ring are used to apply excitation energy and to sense the resulting vibration. Due to slight inaccuracies of fabrication, such rings tend to have two natural resonant frequencies which are close together and which would degrade the Q of the system. Compensation for the ring inaccuracy can be made by applying suitable electrostatic force to the ring, thereby resolving the two resonant frequencies into one and improving the performance of the device.

The application of such electrostatic force involves determining the necessary correction from the sensed vibration and then applying a dc voltage to one, or probably several of the electrodes. To obtain sufficient compensation forces, the device can require either high dc voltages or a large extent of electrode area. These requirements lead to high expense or use of valuable resources; i.e., provision for high voltages increases the cost of the device and the area available for electrodes is limited. The need to use electrodes for other purposes militates against the dedication of sufficient electrode space for compensation by low voltages.

SUMMARY OF THE INVENTION

It is therefore an object of the invention to effectively balance a vibrating sensor microstructure to achieve a single resonant frequency with a low compensating voltage and without usurping electrodes used for other functions. Another object is to economize in the usage of coupling electrodes in a vibrating microstructure sensor while fulfilling the electrode coupling requirement for each function.

A vibrating microstructure sensor of the type employed in the subject invention is disclosed in the following paper: M. Putty and K. Najafi, "A Micromachined Vibrating Ring Gyroscope," Solid-State Sensors and Actuators Workshop, Jun. 13–16, p213–220, (1994). A nickel ring formed in a silicon chip is supported on a central hub by a number of semicircular springs, and a plurality of electrodes on the chip surround the ring, spaced by a gap, to provide capacitive coupling to the ring. An excitation circuit connected to some of the electrodes drives the ring to vibration. The mode of vibration is to squeeze the ring into a first ellipse and then alternately into a second ellipse having its major axis normal to that of the first ellipse. Nodes, or points of no movement, occur at 45° to the axes. When the device is rotated about an axis normal to the plane of the ring, the nodes precess about the ring such that the node positions shift relative to the fixed electrodes, and this shift is detected by a pick-up circuit connected to other electrodes to derive a measure of the rotation, or yaw. A preferred measurement is the yaw rate which is determined by deriving a feedback signal from the tendency of the nodes to shift and applying the feedback to certain electrodes to counter any significant actual shift. In this force-to-rebalance mode the amount of counter force or voltage yields the yaw rate.

Ideally, the ring is perfectly machined so that two modes of vibration have precisely equal natural resonance frequencies. In practice, the ring is not perfect and two different resonant frequencies occur, but they can be made to be close together. A dc voltage applied to the proper electrodes can compensate for the ring imperfection to yield a balanced system with a single resonant frequency. To avoid taking up electrodes needed for excitation, feedback and vibration pickup functions, the dc compensating voltage is in some instances applied to electrodes already used for some of those other functions so that certain electrodes serve double duty. In this manner, sufficient coupling of compensation force can be attained without elevated voltages. In the same way, feedback signals can share electrodes with either the compensation signals or the excitation signals. It is not desirable, however, to share functions with the electrodes used for sense or vibration pickup functions.

BRIEF DESCRIPTION OF THE DRAWINGS

The above and other advantages of the invention will become more apparent from the following description taken in conjunction with the accompanying drawings wherein like references refer to like parts and wherein:

FIG. 4 is a schematic diagram of the sensor of FIG. 1 with the associated sensor circuitry.

DESCRIPTION OF THE INVENTION

A yaw sensor or yaw rate sensor is used to detect the turning of an automotive vehicle about its vertical axis, and the information is useful to correct for undesired movement. If the actual turning of the vehicle differs from the desired movement as determined by the steering wheel position, individual braking or driving adjustments, for example, could be used to reduce or eliminate the error. To be acceptable for use in such an application the sensor must be both accurate and economically feasible.

Figure 1:
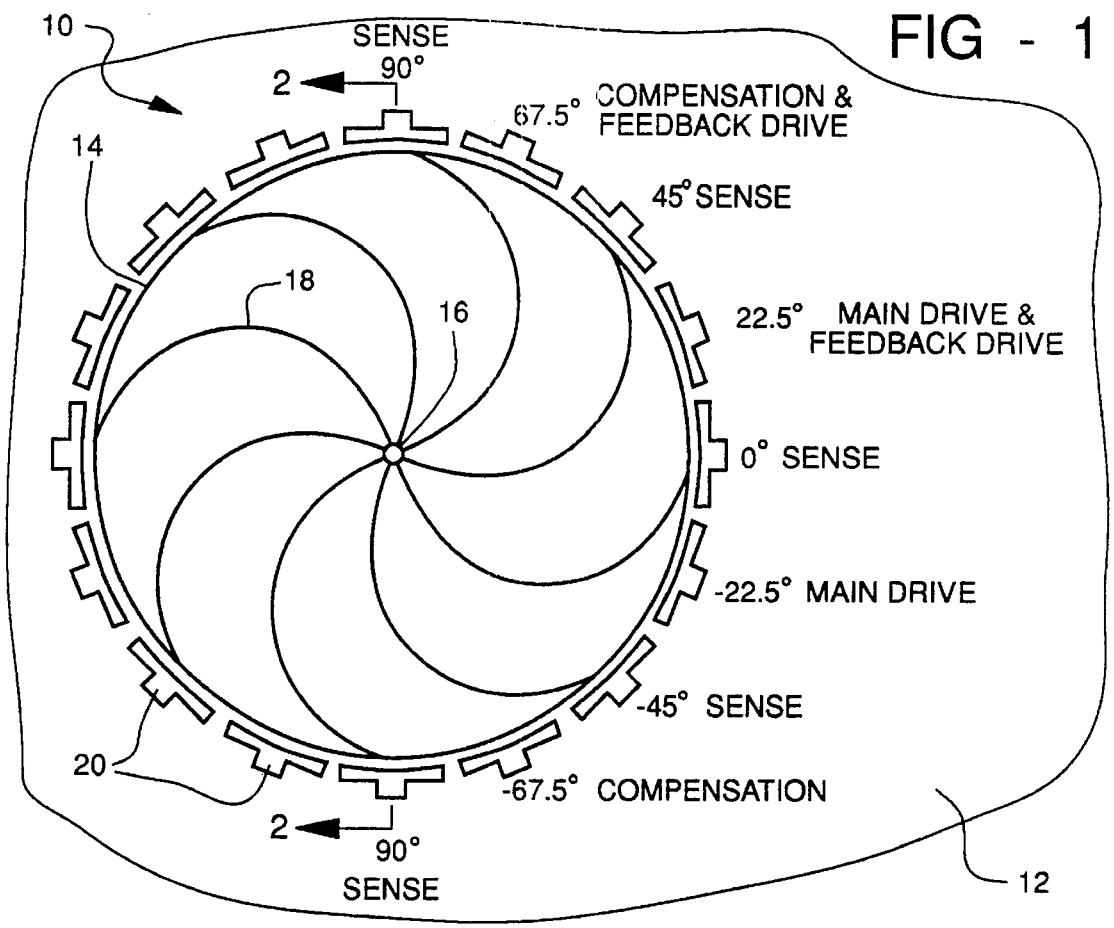
FIG. 1 is a top view of a sensor having a micromachined ring surrounded by electrodes designated for specific functions according to the invention.
Figure 2:
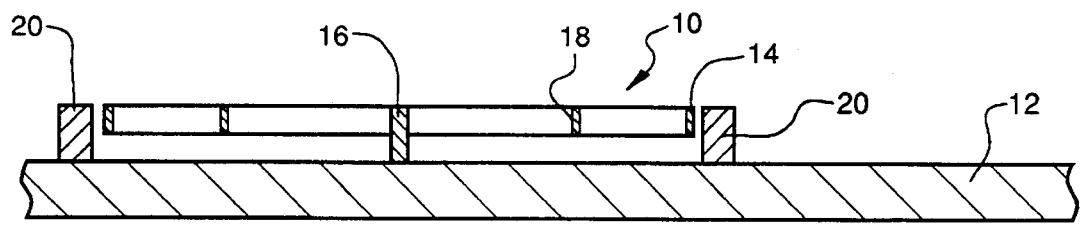
FIG. 2 is a cross section of the sensor of FIG. 1 taken along line 2—2.

Such a yaw or yaw rate sensor is described in the above-mentioned Putty et al paper and is modified according to the present improvement. FIGS. 1 and 2 illustrate a micromachined vibrational element 10 formed on a silicon substrate 12. The element 10, which may be metal such as nickel, comprises a ring 14 supported on a hub 16 by a plurality of semi-circular springs 18, the hub 16 extending normally from the substrate surface. A plurality of electrodes 20, also mounted on the substrate surround the ring and are spaced from the ring by a gap to define a capacitive coupling with the ring. Electrical circuits are connected to each electrode and to the element 10 via the hub 16.

Figure 3:
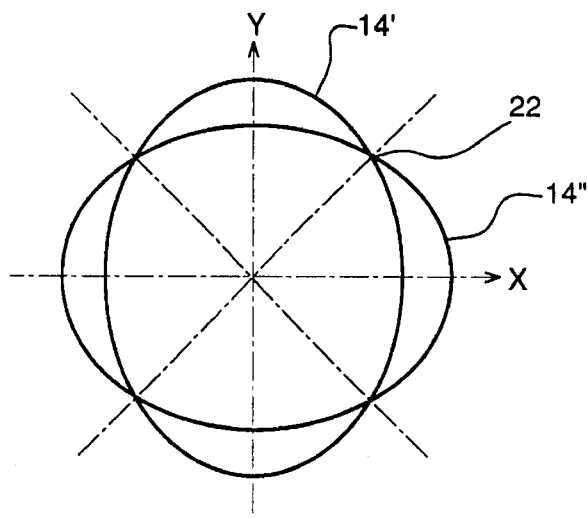
FIG. 3 is an illustration of the ring vibration mode at different times in the vibration cycle.

The ring 14 is excited into vibration by electrostatic forces applied by imposing AC signals, such as square wave voltages on certain electrodes. As shown in FIG. 3 in exaggerated form, the excitation forces applied along an x axis alternately force the normally circular ring 14 into an elliptical shape 14' with its major axis on the y axis and then into another elliptical shape 14" with its major axis on the x axis. This vibration mode results in nodes 22 at 45° to the x axis where no ring displacement occurs in the absence of device rotation. If, however, rotation of the sensor occurs about the ring axis normal to the plane of the ring, the vibration pattern precesses such that the nodes shift through an angle related to the amount of sensor rotation. A measurement of the change of vibration angle or the shift of the nodes can then be used to measure the yaw angle. It is preferred to use the device as a yaw rate sensor using a force-to-rebalance technique; then a feedback driving voltage is applied to certain electrodes to prevent the precession, thus maintaining the nodes 22 substantially at their 45° position. The feedback voltage is then a measure of the yaw rate.

An ideal sensing element has a single natural resonance frequency and the sensor has a high Q. In practice, slight variations of stiffness or mass in the element causes two natural resonant frequencies to occur. The elements can, as a practical matter, be made such that the resonant frequencies are close together, but the system Q will be somewhat lower than a single frequency device. The element can be tuned or balanced by applying electrostatic forces to the ring which compensate for the physical variations and the result is a single resonance. Such forces are derived by sensing and analyzing the ring vibration and producing a dc voltage which is applied to certain electrodes. The electrodes, however, are limited in number and extent, and the optimal application of the main excitation, the feedback excitation and the sensing functions requires most or all of the electrodes. It is proposed here that rather than dedicating each electrode to a single purpose, there are cases where two functions might share an electrode. This relieves the competition for electrodes and allows the dc compensation voltage to be applied to enough electrodes or electrode area, either alone or shared, to attain the necessary balancing force without the expensive alternative of generating high dc voltages for the compensation.

The preferred embodiment has sixteen equally spaced electrodes 20. The function or circuit connection of each electrode is labelled on one side of the ring 14 in FIG. 1; the equivalent function is assigned to a corresponding electrode 180° from each labelled electrode. Half of the electrodes 20 (or one set) are sense electrodes used to pick up ring vibration. These include the 0° electrode position on the x axis and are spaced at 45° intervals around the ring 14. The sense signals are divided into two subsets: those at 0° or 90° intervals, and the remainder. The 90° sense signals are inverted and added to the 0° or 180° sense signals, and the −45° signals are inverted and added to the 45° or 225° sense signals. Sense electrodes are not shared with other functions to avoid degrading the sense function which involves measurement of very small capacitance changes.

The other half of the electrodes (another set) are used for drive and compensation. One subset of drive electrodes is used for main drive excitation and another subset is used for rebalance feedback. These subsets may overlap due to electrode sharing. Since the 0° electrode is dedicated to the sense function, the main excitation drive is applied at 22.5° and −22.5° to effectively apply an x axis force. Similarly, the feedback drive is applied at 22.5° and 67.5° to effectively produce a force at 45° without compromising the sense electrode at 45°. The dc compensation drive is connected to electrodes at 67.5° and −67.5°. This results in the feedback drive sharing electrodes with both the main excitation drive and the compensation drive.

The circuitry applied to the sensor is shown in FIG. 4; there the minimal number of electrode connections is shown for reasons of clarity but it will be understood that preferably all electrodes are utilized as described above. Each subset of sense electrodes is coupled to a low capacitance unity gain buffer amplifier 28 which converts ring vibration to sensed vibration signal. The first sensed vibration signal (based on 0° and 180° positions) is connected to a phase-locked loop 30 where it is summed with a demodulator control signal, and then fed to a loop filter 32 which supplies a voltage controlled oscillator 34. The latter produces AC signals, such as square wave signals including modulator and demodulator outputs for the summers of each of the circuits, and a main AC drive signal, such as square wave drive signal which is connected through 100 Kohm resistors 36 to the ±22.5° electrodes.

The second sensed vibration signal (based on 45° or 225° positions) provides the inputs to both a rate feedback loop 38 and a compensation control loop 40. At the rate feedback loop 38 the sensed vibration signal is amplified at gain amplifier 42, demodulated at a summer and fed to a loop filter 44. One output of the loop filter 44 is the yaw rate and another output is modulated at a summer to produce an AC signal, such as a square wave signal which is coupled through 0.1 μf capacitors 46 to the 67.5° and the 22.5° electrodes. The rate feedback is produced when a tendency to precess is detected by sensing vibration at the nominal nodes 22, and a force is produced by the feedback signal to counter such vibration, thus substantially restricting ring vibration to the main excitation mode.

The compensation control loop 40 demodulates the sensed vibration signal at a summer and a loop filter 50 produces a dc compensation voltage which is applied through 100 Kohm resistors 52 to the ±67.5° electrodes. This voltage is capable of resolving the two resonant frequencies to a single frequency by effectively tuning or balancing the vibrating element 10.

It will thus be seen that the improved micromachined sensor is effective to measure yaw rate and that its driving, compensating and sensing functions can all be optimized without high voltage generation to thereby minimize costs without any degradation of the functions. By using some electrodes for two different functions the number of electrodes can be reduced, yielding a larger area for each electrode for more effective coupling to the ring.

The embodiments of the invention in which an exclusive property or privilege is claimed are defined as follows:

1. A micromachined sensor comprising:
   a micromachined vibration element subject to resonant vibration at two closely spaced frequencies;
   a plurality of electrodes capacitively coupled to the vibration element;
   an excitation circuit for developing an excitation signal for exciting vibration of said vibration element and for sensing vibration of said vibration element;

a feedback circuit for developing a feedback signal for rebalancing said vibration element;

a compensation circuit for producing a compensation signal for substantially resolving the resonant vibration to one frequency; and means for coupling said feedback signal and one of said excitation and compensation signals to at least one electrode of said plurality of electrodes for electrode sharing.

2. A micromachined sensor comprising:

a micromachined vibration element subject to resonant vibration at two closely spaced frequencies;

a compensation circuit for producing a compensation signal for balancing said vibration element to substantially resolve said resonant vibration to one frequency;

coupling means including a plurality of electrodes capacitively coupled to said vibration element;

an excitation circuit producing AC excitation signals for vibrating said vibration element;

a feedback circuit for producing AC feedback signals;

means for connecting at least a first electrode of said plurality of electrodes to more than one of said compensation, excitation and feedback signals; and a vibration sensing circuit coupled to at least a second electrode of said plurality of electrodes for obtaining vibration inputs for said excitation circuit and said compensation circuit.

3. The invention as defined in claim 2 wherein said means for connecting at least a first electrode of said plurality of electrodes includes means for connecting said compensation signal and said feedback signal to said first electrode.

4. The invention as defined in claim 2 wherein said means for connecting at least a first electrode of said plurality of electrodes includes means for connecting said excitation signal and said feedback signal to said first electrode.

5. A microstructure sensor comprising:

a resonant microstructure comprising a ring having two closely spaced natural resonant frequencies;

a plurality of electrodes surrounding said ring and capacitively coupled to said ring;

excitation means having output AC signals coupled to a first set of electrodes for controllably driving said ring into vibration;

compensation means having output DC signals coupled to at least one electrode of the first set of electrodes, thereby imposing both AC and DC signals on said at least one electrode; and vibration sensing means coupled to a second set of electrodes not including said first set of electrodes for obtaining vibration inputs for the excitation means and the compensation means.

6. The invention as defined in claim 5 wherein said excitation means comprises:

a driving circuit having a main excitation signal coupled to a first subset of said first set of electrodes for exciting said ring to a main mode of vibration; and a feedback circuit having a rebalancing signal coupled to a second subset of said first set of electrodes for balancing said ring vibration.

7. The invention as defined in claim 6 wherein:

said output DC signals of said compensation means are coupled to at least one electrode of said second subset of electrodes, whereby said at least one electrode is shared by said feedback circuit and said compensation means.

8. The invention as defined in claim 6 wherein said first and second subsets of electrodes overlap so that said driving circuit and said feedback circuit share at least one common electrode.

9. In a sensor having a vibration microstructure surrounded by a plurality of electrodes capacitively coupled to the microstructure, the microstructure having natural resonance at two closely spaced frequencies, a method of sensor operation comprising the steps of:

producing an excitation voltage for developing a vibration driving force on said microstructure;

sensing vibration of said microstructure via a first set of said plurality of electrodes;

producing a force-to-rebalance voltage;

generating a DC compensation voltage; and applying said force-to-rebalance voltage and one of said excitation and compensation voltages to a second set of said plurality of electrodes not including said first set of said plurality of electrodes for electrode sharing.

* * * * *